United States Patent [19]
Janowicz et al.

[11] Patent Number: 4,680,352
[45] Date of Patent: Jul. 14, 1987

[54] COBALT (II) CHELATES AS CHAIN TRANSFER AGENTS IN FREE RADICAL POLYMERIZATIONS

[75] Inventors: Andrew H. Janowicz; Lester R. Melby, both of Wilmington, Del.

[73] Assignee: E. I. Du Pont de Nemours and Company, Wilmington, Del.

[21] Appl. No.: 821,322

[22] Filed: Jan. 27, 1986

Related U.S. Application Data

[63] Continuation-in-part of Ser. No. 707,367, Mar. 1, 1985, abandoned.

[51] Int. Cl.$^4$ .............................................. C08F 2/40
[52] U.S. Cl. .................................. 526/147; 526/120; 526/131; 526/172; 526/320; 526/327; 526/329.2; 526/329.6; 526/329.7
[58] Field of Search ................ 526/120, 131, 147, 172

[56] References Cited

U.S. PATENT DOCUMENTS 4,526,945 7/1985 Carlson et al. ...................... 526/145

OTHER PUBLICATIONS

*J. Polym. Sci., Polym. Chem. Ed.*, vol. 19, 879 (1981), Enikolopyan et al.
*Vysokomol. soyed.*, A23, No. 5, 1042 (1981), Smirnov et al.
*Dokl. Akad, Nauk SSSR*, 253 891 (1980), Smirnov et al.
*Dokl. Akad. Nauk SSSR*, 254 127 (1980), Smirnov et al.
*Vysokokol, soyed.*, A23 No. 11, 2588 (1981), Smirnov et al.
*Dokl. Akad, Nauk SSSR*, 265 889 (1982), Pashchenko et al.
*J. Polym. Sci., Polym. Chem. Ed.*, vol. 22, 3255 (1984), Burczyk et al.
*Indian Journal of Chemistry*, vol. 18A, 242 (1979), Rai et al.
*J. Am. Chem. Soc.*, 106, 5197 (1984), Bakac et al.
*Z. anorg. allg. Chem.*, 343 299 (1966), Uhlig et al.
*J. prakt. Chem.*, 323 857 (1981), Bremer et al.
*Inorg. Syn.*, 11, 64 (1968), Schrauzer.
*J. Am. Chem. Soc.*, 77, 5820 (1955), McCarthy et al.
Smirnov et al., *Dokl. Akad. Nauk SSSR*, 255, 609–612 (1980).
Cacioli et al., *J. Macromol.*, A23, 839–852 (1986).
Abbey et al., *Proceedings of the ACS Division of Polymeric Materials Science and Engineering*, 55, 235–238 (1986).
Cacioli et al., *Polymer Bulletin*, 11, 325–328 (1984).

*Primary Examiner*—Edward J. Smith

[57] ABSTRACT

Free radical polymerization processes employing cobalt(II) chelates of vicinal iminohydroxyimino compounds, diazadihydroxyiminodialkyldecadienes and -undecadienes, tetraazatetraalkylcyclotetradecatetraenes and -dodecatetraenes, N,N'-bis(salicylidene)ethylenediamines and dialkyldiazadioxodialkyldodecadienes and -tridecadienes as catalytic chain transfer agents for controlling the molecular weight of the homopolymers and copolymers produced.

13 Claims, No Drawings

COBALT (II) CHELATES AS CHAIN TRANSFER AGENTS IN FREE RADICAL POLYMERIZATIONS

CROSS-REFERENCE TO RELATED APPLICATIONS

This application is a continuation-in-part of copending application Serial No. 707,367, filed on March 1, 1985, now abandoned.

BACKGROUND OF THE INVENTION

1. Field of the Invention

This invention relates to styrene and acrylic free radical polymerization processes employing cobalt(II) chelates of vicinal iminohydroxyimino compounds and diazadihydroxyiminodialkyldecadienes and -undecadienes, tetraazatetraalkylcyclotetradecatetraenes and -dodecatetraenes, N,N,-bis(salicylidene)ethylenediamines and dialkyldiazadioxodialkyldodecadienes and -tridecadienes as catalytic chain transfer agents for controlling the molecular weight of the styrene and acrylic homopolymers and copolymers produced.

2. Background

In any polymerization process it is necessary to be able to control the molecular weight of the polymer produced so that it may be fitted to a particular use or need. For example, in unperturbed polymerization systems which fundamentally tend to produce high molecular weight polymers, it may be desirable or necessary to limit the molecular weight of the polymers produced, and this must be done in a predictable and controllable fashion. Such molecular weight limitation may be desirable or necessary in the preparation of polymer solutions for use in paints and finishes which require high solids contents to assure reduced solvent emission during application and yet which require low viscosity to facilitate ready application.

In free radical polymerizations there are several conventional means of effecting such molecular weight limitation, but all have notable disadvantages. These include (1) The use of a high initiator/monomer ratio, but this is costly in terms of initiator consumption.

(2) Polymerizing at high temperatures, for example, about 150°C., which is undesirably energy intensive.

(3) Adding stoichiometric amounts of thiol chain transfer agents to the polymerizing system, but the attendant incorporation of sulfur-containing agents into the polymer renders it less durable than is desired.

(4) Odor problems associated with the use of sulfur-containing chain transfer agents.

Catalytic chain transfer to the monomer as a means of controlling molecular weight in the radical polymerization of methyl methacrylate and styrene in the presence of cobalt(II) porphyrin complexes is known in the art. N. S. Enikolopyan et al., J. Polym. Sci., Polym. Chem. Ed., Vol. 19, 879 (1981), describe the kinetics and the molecular weight control achieved in the free radical polymerization of methyl methacrylate in the presence of a cobalt complex of hematoporphyrin tetramethyl ether. This use of this cobalt complex is also discussed by B. R. Smirnov et al in Vysokomol. soyed., A23, No. 5, 1042 (1981) and by B. R. Smirnov et al. in Dokl. Akad. Nauk SSSR, 253, 891 (1980). In a similar study, B. R. Smirnov et al., Dokl. Akad. Nauk SSSR, 254, 127 (1980), describe studies carried out with hematoporphyrin tetramethyl ester. The authors conclude that only the combination of cobalt with a tetrapyrrole porphyrin ligand apparently permits the realization of catalysis of chain transfer to the monomer, and that it has been ruled out that analogous phenomena will be discovered during the investigation of complexes similar in spatial and electronic structure to the porphyrins, such as phthalocyanines, corrins, cobaloximes, etc. B. R. Smirnov et al., VysokomoI soyed., A23, No. 11, 2588 (1981), describe the catalytic chain transfer observed in the radical polymerization of styrene in the presence of a cobalt complex of hematoporphyrin IX tetramethyl ester.

D. E. Pashchenko et al., Dokl. Akad. Nauk SSSR, 265, 889 (1982), describe chain transfer studies with cobalt porphyrins in the polymerization of methyl methacrylate. Regarding this paper, it is not understood what is meant by "cobalt complexes of porphyrins and cobaloximes" since there is no further mention of "cobaloximes" in the English language version of the paper; moreover, the term "cobaloximes" does not appear in the original Russian text, but rather the term "cobalamines", which are vitamin B12-related structures similar to the porphyrin structures disclosed in this paper and in the other publications cited above.

Although the use of the porphyrin complexes circumvents many of the problems associated with the aforesaid conventional commercial processes, the complexes impart too much color to the final product, rendering it useless or less desirable in many applications, such as in certain paints and finishes. Moreover, the cost of the porphyrin complex is rather high.

A. F. Burczyk et al., J. Polym. Sci., Polym. Chem. Ed., Vol. 22, 3255 (1984), disclose that cobaloximes, that is, bisdimethylgloximatocobalt complexes, are often used as analogs of cobalt porphyrins in research studies, and they further disclose the use of cobaloxime, synthesized from Co(II) acetate and dimethylglyoxime, as a relatively cheap chain transfer agent in the free radical polymerization of methyl methacrylate. The cobaloxime of Burczyk et al. is shown on page 3256 as being of the formula

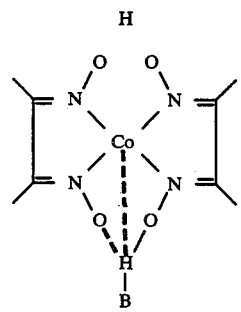

wherein B is a coordinating base ligand, such as triphenylphosphine. Similar disclosures are made by A. F. Burczyk in a thesis to the University of Waterloo, Waterloo, Ontario, 1984. Carlson et al., U.S. Pat. No. 4,526,945, also disclose the use of cobalt(II) dimethylgloxime and similar cobalt(II) dioxime pyridine complexes such as those derived from 2,3-butanedione, 2,3-hexanedione, 2,4-heptanedione, 2,5-dimethyl-3,4-hexanedione, 3-methyl-2,4-hexanedione, 1,2-cyclohexanedione, 3-phenyl-2,4-pentanedione, 2-naphthylglyoxal, camphoroquinone, 4-chloro-1,2-benzoquinone, 1,2-napthoquinone, 3,7-dimethyl-1,2-napthoquinone, 3-chloro-1,2-napthoquinone or substituted 1,2-anthraquinones as molecular weight control agents in homogeneous polymerizations.

H. C. Rai et al., Indian Journal of Chemistry, Vol. 18A, 242 (1979), describe the preparation of the cobalt chelates of cobalt(II) with 4,7-diaza-2,9-dihydroxyimino-3,8-dimethyldeca-3,7diene and cobalt(II) with 4,8-diaza-2,10-dihydroxyimino- 3,9-dimethylundeca-3,8-diene. See Example 1 herein. There is no disclosure as to the use of these compounds as catalytic chain transfer agents. E. Uhlig et al., Z. anorg. allg. Chem., 343, 299 (1966), describe the preparation of the ligands 4,7-diaza-2,9-dihydroxyimino-3,8-dimethyldeca-3,7-diene and 4,8-diaza-2,10-dihydroxyimino-3,9-dimethylundeca-3,8-diene. See Example 1 herein J. Bremer et al., J. prakt. Chem., 323, 857 (1981), describe the preparation of the chelate of cobalt(II) and 1,4,8,11-tetraaza-2,3,9,10-tetramethyl-1,3,8,10-cyclotetradecatetraene (TTCT) See Example 5 herein. G. N. Schrauzer, Inorg. Syn., 11, 64 (1968), describes the preparation of diaqua bis(2,3-dihydroxyiminobutanato)Co(II) and Schrauzer, ibid, page 62, describes the preparation of chloro pyridino bis(2,3-dihydroxyiminobutanato)-Co(III). See Example 25 herein. P. J. McCarthy et al., J. Am. Chem. Soc., 77, 5820 (1955), describe the preparation of 5,8-diaza-2,11-dioxo-4,9-dimethyldodeca-4,8-diene. See Example 28 herein. A. Bakac et al., J. Am. Chem. Soc., 106, 5197 (1984), describe the preparation of [Co(II)(2,3-dihydroxyiminobutanato-$BF_2$)$_2$($H_2O$)$_2$ It is an object of this invention to provide cobalt(II) chelates of vicinal iminohydroxyimino compounds, diazadihydroxyiminodialkyldecadienes and -undecadienes, tetraazatetraalkylcyclotetradecatetraenes and -dodecatetraenes, N,N,'-bis(salicylidene)ethylenediamines and dialkyldiazadioxodialkyldodecadienes and -tridecadienes which operate as highly efficient catalytic chain transfer agents for controlling styrene and acrylic homopolymer and copolymer molecular weights, while imparting very little, if any, color to the final products, making them more useful in many applications, such as in paints and finishes. Another object is to provide such a process which proceeds at modest temperatures, for example, about 80° to about 110° C., with limited amounts of initiator and in the absence of stoichiometrically reacting chain transfer agents. These and other objects will become apparent hereinafter.

SUMMARY OF THE INVENTION

The present invention provides an improved free radical polymerization of acrylic and/or styrene monomers wherein molecular weight control is effected by means of a chain transfer agent, the improvement characterized in that the chain transfer agent is a cobalt chelate of specified formula.

DETAILED DESCRIPTION OF THE INVENTION

This invention resides in styrene and acrylic polymerization processes employing cobalt(II) chelates as catalytic chain transfer agents for controlling the molecular weights of the styrene and acrylic homopolymers and copolymers produced. The cobalt chelates consist of cobalt(II) coordinated to the ligands: vicinal iminohydroxyimino compounds (I), diazadihydroxyiminodialkyldecadienes and -undecadienes (II), tetraazatetraalkylcyclotetradecatetraenes and -dodecatetraenes (III), N,N,'-bis(salicylidene)ethylenediamines (IIIA) and dialkyldiazadioxodialkyldodecadienes and -tridecadienes (IIIB). By "ligand" as the term is used herein is meant any atom, radical or molecule which can bind to a characteristic or central element of a complex. The structures of the aforesaid ligands are given below.

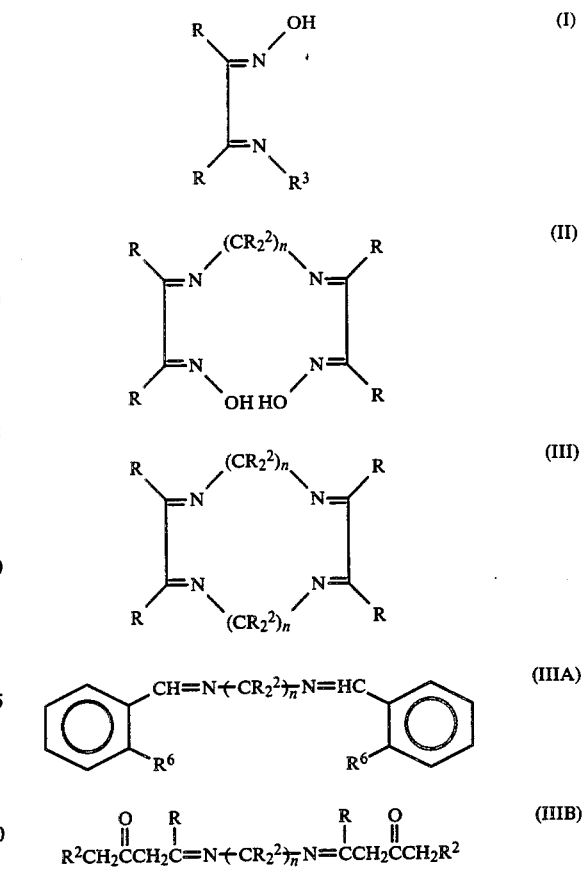

In the aforesaid formulas each R, independently, is phenyl or $C_1$ to $C_{12}$ alkyl wherein each a-carbon atom contains two hydrogen atoms, that is, is unsubstituted, or R and R on adjacent carbon atoms, taken together, is $C_5$ to $C_8$ cycloalkylene, unsubstituted in the a-positions; $R^2$ is H or $C_xH_{2x+1}$ wherein x is 1 to 12; each $R^3$, independently, is H or $C_1$ to $C_{12}$ branched or straight alkyl; R6 is OH or NH ; and n is 2 or 3. Further regarding structure IIIA, each of either or both aromatic rings can be unsubstituted or substituted with up to four substituents that are compatible with the use of this complex herein as a chain transfer agent Examples of such substituents include $-OR^2$, $-NR^2$ —Br, —I, $-NO_2$ and $-R^5$ wherein $R^5$ is $C_xH_{2x+1}$ wherein x is 1 to 12. In addition, each of either or both aromatic rings can be substituted with a benzo group so as to form a naphthalene derivative. The corresponding structures for the cobalt chelates of these ligands are given below. More specifically, the corresponding cobalt chelates of structure I is IV; the corresponding cobalt chelates of structures II, III, IIIA and IIIB are, respectively, VI, VII, VIII and IX.

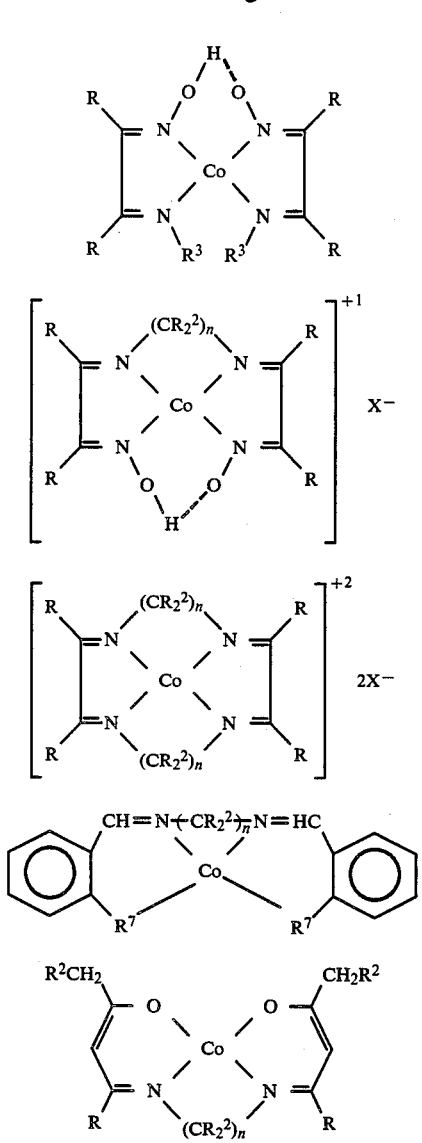

In formulas IV through IX, R, $R^2$, $R^3$ and n are as defined above; each $R^7$ is either O or NH; and $X^-$ is $NO^-$, $Cl^-$, $I^-$, $BF_4^-$, $SbF_6^-$ or $R^1COO^-$ wherein $R^1$ is $C_1$ to $C_{12}$ alkyl. The cobalt chelates of the above formulas may also, but need not, be coordinated with additional ligands derived from materials present in the reaction medium. The cobalt complex VIII wherein $R^2$ is H, $R^7$ is O and n is 2 is referred to in Example 27 as Co(II)S-alen]. Further regarding structure VIII, each of either or both aromatic rings can be unsubstituted or substituted as disclosed above for structure IIIA.

The cobalt chelates of structures IV, VI, VII, VIII and IX can be prepared by reacting
IV: I and Co(II)X$_2$
VI: II and Co(II)X$_2$
VII: III and Co(II)X$_2$
VIII: IIIA and Co(II)X$_2$
IX: IIIB and Co(II)X$_2$ As will be apparent to one skilled in the art, these chelates also can be prepared in situ from appropriate reactants. The in situ preparation is discussed further below and is demonstrated in the examples herein.

The analogous cobalt(III) complexes can be used in the process of this invention if the cobalt(III) can easily be reduced to cobalt(II) by reaction with the free radicals produced by the initiator. This permits the in situ production of the cobalt(II) complexes of the invention. Example 25 is representative of this alternative procedural embodiment.

The preferred chain transfer agents herein are cobalt-(II) salts coordinated to the ligand 4,7-diaza-2,9-dihydroxyimino-3,8-dimethyldeca-3,7-diene, referred to in the examples as (DDDD-H$_2$). The ligand is prepared by condensation of 3-hydroxyiminobutane-2-one with ethylenediamine. The complex can be prepared in situ by adding the cobalt salt and the ligand, as separate components, to a mixture of solvent, monomer and initiator prior to applying heat (batch run), or to the monomer-initiator mixture alone if it is to be fed into refluxing solvent (feed run). Alternatively, the complex can be prepared and stored as a standard solution for subsequent addition to the mixture to be polymerized. For such standard solutions the cobalt(II) salt can be in the form of the nitrate, chloride, bromide, iodide, fluoroborate, hexafluorophosphate or hexafluoroantimonate, either as hydrated or anhydrous, or as an alkanoate, the lower (C$_2$-C$_3$) alkanoates being soluble in methanol or ethanol, the higher (C$_4$-C$_8$) alkanoates providing a means of preparing the standard solutions in hydrocarbon solvents.

The polymerization can be carried out either in the absence of or in the presence of a polymerization medium. Many common organic solvents are suitable as polymerization media. These include aromatic hydrocarbons, such as benzene, toluene and the xylenes; ethers, such as tetrahydrofuran, diethyl ether and the commonly available ethylene glycol and polyethylene glycol monoalkyl and dialkyl ethers, including the Cellosolves and Carbitols ; alkyl esters of acetic, propionic and butyric acids; and mixed ester-ethers, such as monoalkyl ether-monoalkanoate esters of ethylene glycol. In addition, ketones, such as acetone, butanone, pentanone and hexanone, are suitable, as are alcohols, such as methanol, ethanol, propanol and butanol. In some instances, it may be advantageous to use mixtures of two or more solvents The polymerizations can be carried out at 50°–150° C. The preferred range is 80°–110° C.

Any of the known class of azo polymerization initiators is suitable provided it has requisite solubility in the solvent or monomer mixture chosen and has an appropriate half life at the temperature of polymerization. Preferably, the initiator has a half life of from about 1 to about 4 hours at the temperature of polymerization. Most preferably, the initiator is at least one selected from the group consisting of azocumene; 2,2,'-azobis-(isobutyronitrile); 2,2,'-azobis(2-methyl)butanenitrile; 4,4,'-azobis (4-cyanovaleric acid); and 2-(t-butylazo)-2-cyanopropane. Other non-azobis initiators having the requisite solubility and appropriate half life may also be used.

The process of the invention can be carried out as either a batch or feed process. When carried out in the batch mode, the reactor is charged with monomer, comonomer, solvent and monomer, or solvent and comonomer, and the mixture is stirred under an inert atmosphere (such as nitrogen, argon or helium), at room temperature, for a minimum of one-half hour to ensure deaeration, that is, the substantial removal of oxygen. To the mixture is then added the requisite amount of initiator, typically such that M/I is 100 to 200. When the initiator has dissolved, the catalyst solution is injected in or, alternatively, the catalyst is formed in situ by adding the components thereof, ligand and the appropriate cobalt(II) compound. In some cases the catalyst may be added in solid form if the chelate has previously been isolated as such. In typical examples, it is added in amount such that the catalyst/initiator ratio C/I is in the range 0.005-0.060. After all additions have been completed, the mixture is heated to boiling and refluxed for the requisite time, usually one-half hour to six hours.

If the polymerization is to be carried out as a feed system, the reactor is charged with solvent and deaerated, either before or after being charged with solvent. Into a separate vessel are placed the monomer and the initiator, which are then stirred or otherwise agitated until the initiator has dissolved. The catalyst is then added and the mixture is immediately taken up in a syringe which is fitted to a syringe pump. Alternatively, the separate vessel may be fitted to any other suitable pumping device. The solvent in the reactor is heated to reflux and stirred under an inert atmosphere while the monomer-initiator-catalyst solution is introduced. The rate of feed is arbitrary and is determined largely by the quantity of the solution. When the feed is completed, refluxing is continued for at least an additional one-half hour.

In either type of process the polymer is isolated by stripping off solvent and unreacted monomer or by precipitation with a nonsolvent. Alternatively, the polymer solution may be used as such if appropriate to its application.

The process of the invention is carried out most effectively with styrene and methacrylate ester monomers, but acrylate esters can be included as comonomers with the methacrylate esters and/or styrene, without diminution of the advantages of the invention process. Methacrylates which are useful in this invention include branched alkyl or n-alkyl esters of $C_{1-12}$ alcohols and methacrylic acid, for example, methyl and ethyl methacrylate. Other monomers include, but are not restricted to, allyl, glycidyl, hydroxyalkyl (for example, hydroxyethyl and hydroxypropyl), allyloxyethyl, 2,4-hexadienyl (sorbyl) and dialkylaminoalkyl methacrylates.

To ensure maximum catalyst activity the polymerizations should be carried out in the substantial absence of oxygen under an inert atmosphere, such as nitrogen, argon or other non-oxidizing gas "Deaeration", as the term is used herein, means the substantial removal of oxygen.

In the following examples which demonstrate the process of the invention, all temperatures are in degrees Celsius. Examples 6, 7, 13 and 14 demonstrate feed processes; the remaining examples demonstrate batch processes.

EXAMPLE 1

A. Preparation of 4,7-Diaza-2,9-dihydroxyimino-3,8-dimethyldeca-3,7-diene (DDDD-H$_2$)

A mixture of 40.4 g (0.4 mol) of -hydroxyiminobutane-2-one and 12 g (0.2 mol) of ethylenediamine in 400 mL of ethanol was boiled under reflux for one-half hour. The mixture was chilled to 5° C. and there was deposited 24.2 g (54% yield) of white crystals, mp 176°-177° (literature mp 166° C. U.S. Patent 2,400,876 and E. Uhlig and M. Friedrich, Z. anorg. allg. Chem., 343, 299 (1966)). Anal. Calcd. for $C_{10}H_{18}N_4O_2$ C, 53.1; H, 8.0; N, 24.8. Found: C, 52.9; H, 7.9; N, 24.6.

B. Preparation of [Co(II)DDDD-H]$^+$CH$_3$COO$^-$

To a solution of 50 mg of cobalt(II) acetate tetrahydrate in 200 mL of deaerated methyl ethyl ketone was added 45 mg of DDDD-H$_2$ (prepared as in Part A) and the mixture was stirred for 18 h in a nitrogen-flushed, septum-sealed bottle. The solution was brown-amber and was cloudy with a trace of finely divided material. The concentration of [Co(II)(DDDD-H)]$^+$ CH$_3$COO$^-$ thus formed was $1.0 \times 10^{-3}$ M.

C. The Use of [Co(II)DDDD-H]$^+$ CH$_3$COO$^-$ as a Catalytic Chain Transfer Agent in the Free Radical Polymerization of Methyl Methacrylate—Batch Process A reaction vessel was charged with 79 mL of reagent grade methyl ethyl ketone and 21 mL (0.2 mol) of commercial grade inhibited methyl methacrylate. The mixture was stirred under nitrogen for one-half hour and 0.33 g (0.002 mol) of 2,2'-azobis(isobutyronitrile) was added; stirring was continued for an additional 15 minutes. The molar ratio of monomer to initiator (M/I) was 100. To this was added 20 mL ($2 \times 10^{-5}$ mol) of the catalyst from Part B via syringe (catalyst/initiator, C/I, thus being 0.01). The mixture was boiled under reflux for 5 h. The reaction mixture was at first amber, it developed a reddish hue during the first hour of reflux, and then lost color and became a clear tan. The solution was cooled, 5 mg of hydroquinone was added, and the solvent was stripped out on a rotary evaporator. The product was a viscous colorless oil obtained in 48% conversion. The NMR of the oil was almost perfect for a trimer of methyl methacrylate, with a methyl group at one end and a vinyl group at the opposite end, of the formula

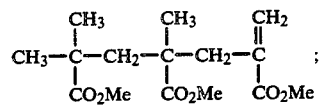

w 0.93-1.2, multiplet, main peak w 1.17, 9H, C-C$\underline{H}_3$; w 1.88-2.18, multiplet, 2H, backbone C$\underline{H}_2$; w 2.51-2.70, multiplet, main peak 2.63, 2H, —C$\underline{H}_2$adjacent to vinyl-group; w 3.63, 3.66, 3.78, 9H, —OC$\underline{H}_3$; w 5.57, 6.25, 2H, terminal =C$\underline{H}_2$.

A duplicate experiment carried out without the catalyst produced poly(methyl methacrylate) having the following characteristics: $\overline{M}_n$ 4,830, $\overline{M}_w$ 10,900 $\overline{M}_w/\overline{M}_n$ 2.25, peak MW 7,940.

EXAMPLE 2

The Use of [Co(II)DDDD-H]$^+$ n-C H$_9$CH(C$_2$H$_5$)Coo$^-$ as a Catalytic Chain Transfer Free Agent in the Free Radical Polymerization of Methyl Methacrylate-In Situ Formation of Catalyst A 0.198 g portion of a solution of cobalt(II) 2-ethylhexanoate, henceforth called cobalt octanoate, in naphtha (6% Co, commercial source) was diluted with 200 mL of methyl ethyl ketone to obtain a $1 \times 10^{-3}$ M solution.

Similarly, a $1 \times 10^{-3}$ M solution of the ligand from Example 1A was made by dissolving 45 mg thereof in 200 mL of methyl ethyl ketone.

A reaction vessel was charged with 21 mL (0.2 mol) of methyl methacrylate and 60 mL of methyl ethyl ketone and then chilled to 0°-5°. To it was added 0.33 g 0.002 mol) of 2,2,'-azobis(isobutyronitrile) (M/I=100) and the mixture was stirred under a nitrogen atmosphere for 1 h. Into the mixture was injected 20 mL each of the above cobalt salt and ligand solutions. The homogeneous solution assumed a dirty straw color immediately. The cooling bath was removed and the mixture was boiled under reflux for 5 h. Application of heat resulted in a lightening of color. The mixture was worked up as in Example 1C. The product was a viscous straw-colored oil (12.3 g, 61% conversion) which was very similar in constitution to the product from Example 1C.

EXAMPLE 3

The Use of $[Co(II)DDDD-H]^+$ $n-C_4H_9CH(C_2H_5)COO^-$ a Catalytic Chain Transfer Agent in the Free Radical Copolymerization of Styrene and Methyl Methacrylate A polymerization vessel was charged with 5 mL (0.044 mol) of commercial grade, inhibited styrene, 16.5 mL (0.156 mol) of methyl methacrylate and 91 mL of methyl ethyl ketone. The mixture was cooled to 0°–5°, 0.33 g (0.002 mole) of 2,2'-azobis(isobutyronitrile) was added, and the solution was stirred under a nitrogen atmosphere for 0.5 h. To the cold solution was added 4 mL each of the cobalt octanoate and ligand solutions prepared as in Example 2. The addition of the ligand solution produced an immediate light amber color. The procedure was the same as described in Example 2 with the exception of the reflux time, which was 6 h. The product was a foamy solid for which GPC showed: $\overline{M}_n$ 717, $\overline{M}_w$ 2,170, $\overline{M}_w/\overline{M}_n$ 3.02, peak MW 1,650. The NMR spectrum characteristically showed two pairs of well-resolved vinyl proton resonances at w 5.4 and 6.1, and w 5.2 and 6.0.

A duplicate experiment carried out without the catalyst produced a copolymer of styrene and methyl methacrylate having the following characteristics: $\overline{M}_n$ 4,540, $\overline{M}_w$ 9,590, $\overline{M}_w/\overline{M}_n$ 2.11, peak MW 8,000; it lacked the characteristic NMR vinyl resonances.

EXAMPLE 4

Molecular Weight of Poly(methyl methacrylate) as a Function of $[Co(II)DDDD-H]^+$ $n-C_4H_9CH(C_2H_5)COO^-$ Concentration Potassium carbonate (83 mg; 0.006 mol), 0.136 g (0.0006 mol) of ligand from Example 1A, a magnetic stirring bar and 200 mL of methyl ethyl ketone were added to a bottle which was then sealed with a rubber septum. While magnetically stirring, nitrogen was bubbled into the mixture for one hour through a syringe needle, the bottle being vented to a bubbler. Then 0.6 mL (0.0006 mol) of cobalt octanoate in naphtha (6% Co, as in Example 2) was injected, the nitrogen bubbling was stopped, and the mixture was stirred for 16 h. The catalyst concentration was nominally 0.003 M. The solution was deep reddish-brown and contained a finely divided suspension.

Three reactors were set up, each with 21 mL (0.2 mol) of methyl methacrylate and 97 mL of methyl ethyl ketone, each chilled and deaerated as previously described; then, to each was added 0.002 mol of 2,2,'-azobis(isobutyronitrile) (M/I=100). This was followed by the addition of, respectively, 1.7, 3.4, and 6.8 mL of the catalyst from the previous paragraph, such that the respective C/I ratios were 0.0025, 0.005 and 0.01. Polymerization and workup was carried out as described in Example 1C. Molecular weight dependencies are shown in Table I.

TABLE I

| C/I | $\overline{M}_n$ | $\overline{M}_w$ | $\overline{M}_w/\overline{M}_n$ | Peak MW |
|---|---|---|---|---|
| 0.0025 | 2,300 | 5,150 | 2.24 | 3,800 |
| 0.005 | 1,700 | 3,830 | 2.16 | 2,800 |
| 0.01 | 1,270 | 3,070 | 2.41 | 2,100 |

From these data it can be seen that the molecular weight of the polymer produced is inversely proportional to catalyst concentration.

EXAMPLE 5

A. Preparation of $[Co(II)TTCT]^{+2}$ $NO_3^-$

The subject chelate was prepared as a 0.3 M solution in methanol following the procedure of J. Bremer, V. Dexheimer and K. Madeja, J. prakt. Chem., 323, 857 (1981). Into a 125 mL Erlenmeyer flask containing a magnetic stirring bar was placed 5.8 g (0.02 mol) of cobalt(II) nitrate hexahydrate; the flask was flushed with nitrogen and sealed with a rubber septum. Into it was syringed 67 mL of deaerated, reagent-grade methanol, and the mixture was stirred for 15 minutes to dissolve the salt. While still stirring, 6.6 mL (5.9 g, 0.08 mol) of 1,3-diaminopropane was injected and the solution turned dark red-brown. This was followed by the addition of 7.0 mL (6.9 g, 0.08 mol) of 2,3-butanedione, whereupon the solution turned deep purple. A 2.0 mL portion of the mixture was removed and diluted to 200 mL with deaerated methanol in a nitrogen-flushed septum-sealed bottle to obtain a 0.003 M solution.

B. Preparation of $[Co(II)TTCT^{+2}2[n-C_4H_9CH(C_2H_5)COO^-]$

Into a nitrogen-flushed, 2-ounce (60 mL) septum-sealed bottle containing a magnetic stirring bar was injected 10 mL of cobalt(II) octanoate in naphtha (1 M, 6% Co) and 20 mL of absolute ethanol; while stirring, nitrogen was bubbled in for 0.5 h. To the stirred mixture was added 3.3 mL (0.04 mol) of 1,3-diaminopropane, followed by 3.5 mL (0.04 mol) of 2,3-butanedione; the mixture was stirred for 5 minutes A 2.0 mL portion of the mixture was removed and diluted with 198 mL of deaerated methyl ethyl ketone to obtain a 0.003 M solution.

Alternatively, a 0.1 M solution of catalyst in ethanol can be prepared similarly from 10 mL of the 1 M cobalt octanoate, 3.3 mL of 1,3-diaminopropane, 3.5 mL of 2,3-butanedione and 90 mL of ethanol.

C. The Use of $[Co(II)TTCT]^{+2}$ $2 NO_3^-$ and $[Co(II)TTCT]^{+2}$ $2[n-C_4H_9CH(C_2H_5)COO]^-$ as Catalytic Chain Transfer Agents in the Free Radical Polymerization of Methyl Methacrylate Two polymerizations were carried out in a manner similar to those described in Example 4 except that in one, the catalyst comprised 6.7 mL of the 0.003 M $[Co(II)TTCT]^{+2}2 NO_3^-$ solution from Part A, and in the other, 6.7 mL of the $[Co(II)TTCT]^{+2} 2[n-c_4H_9CH(C_2H_5)COO]$-from Part B, such that C/I=0.01 in each. Molecular weight data for the polymer products are shown in Table II.

TABLE II

| Catalyst Source | % Conversion | $\overline{M}_n$ | $\overline{M}_w$ | $\overline{M}_w/\overline{M}_n$ | Peak MW |
|---|---|---|---|---|---|
| Part A | 71 | 2680 | 5420 | 2.02 | 4200 |

TABLE II-continued

| Catalyst Source | % Conversion | $\overline{M}_n$ | $\overline{M}_w$ | $\overline{M}_w/\overline{M}_n$ | Peak MW |
|---|---|---|---|---|---|
| Part B | 77 | 3130 | 5660 | 1.81 | 5000 |

These data may be compared with that given in Example 1C for the uncatalyzed control.

EXAMPLE 6

The Use of [Co(II)DDDD-H]+ n-C4H9CH(C2H5)COO- as a Catalytic Chain Transfer Agent in the Free Radical Polymerization of Methyl Methacrylate—Feed Process Five reaction vessels equipped with stirrers, reflux condensers and pumps for feeding in monomer were charged, respectively, with 85, 94, 95, 92 and 100 mL of methyl ethyl ketone and then deaerated by stirring under nitrogen for about 0.5 h. To each was added 0.33 g (0.002 mol) of 2,2,'-azobis(isobutyronitrile) followed by equal volumes of 0.003 M cobalt octanoate and DDDD-H2 (Example 1A) ligand solutions in methyl ethyl ketone, such as to achieve the decreasing C/I ratios shown in Table III, the last with no catalyst serving as the control. The pumps were charged with 21 mL (20 g, 0.2 mol) of methyl methacrylate, the polymerization vessel contents were quickly heated to reflux, and monomer was fed into the refluxing mixtures during a period of about 2.5 h. Refluxing was continued for an additional one hour, and the mixtures were then cooled and stripped free of solvent (60°, 15 Torr). Table III shows the effect of changing C/I ratios on the molecular weight of the poly(methyl methacrylate) produced.

TABLE III

| C/I | % Conversion | $\overline{M}_n$ | $\overline{M}_w$ | $\overline{M}_w/\overline{M}_n$ | Peak MW |
|---|---|---|---|---|---|
| 0.01 | 60 | 106 | 1,520 | 14.29 | Bimodal* |
| 0.008 | 61 | 2,620 | 5,010 | 1.91 | 4,500 |
| 0.0065 | 55 | 4,210 | 10,700 | 2.55 | 10,000 |
| 0.005 | 68 | 6,890 | 15,600 | 2.27 | 12,600 |
| 0.00 | 69 | 6,670 | 16,900 | 2.53 | 15,800 |

*50 and 3,200

These experiments show that catalysis of chain transfer occurs in both feed and batch processes.

EXAMPLE 7

A. Preparation of 4,8-Diaza-2,10-dihydroxyimino-3,9-dimethylundeca-3,8-diene (DDUD-H2)

A solution of 20.2 g (0.2 mole) of 3-hydroxyiminobutane-2-one in 200 mL of ethanol was heated to reflux and a solution of 7.1 g (0.1 mol) of 1,3-diaminopropane in 50 mL of ethanol was added thereto over a period of 0.5 h. After the addition, refluxing was continued an additional 2 h; then 100 mL of the solvent was distilled out and the mixture was cooled to room temperature. A small portion (about 1 mL) was removed and diluted with water until solids formed; the main portion was then seeded with the solids and refrigerated for 2 h. The crystalline solid (8.3 g) which formed was collected and recrystallized from 50 mL of ethanol to obtain 5.5 g (23% yield) of pure product DDUD-H2, mp 140°-141° Anal Calcd. for C11H20N4O2 C, 55.0; H, 8.4; N, 23.3. Found: C, 55.1; H, 8.5; N, 23.0.

A 0.003 M solution of the DDUD-H2 in methyl ethyl ketone was prepared for subsequent use.

B. The Use of [Co(II)DDUD-H]+ n-C4H9CH(C2H5)COO- a Catalytic Chain transfer Agent in the Free Radical Polymerization of Methyl Methacrylate - Feed Process Reaction vessels were set up as described in Example 6, except that they were charged with 0.003 M solutions of DDUD-H2 (Part A) and cobalt octanoate in methyl ethyl ketone to achieve C/I values as set forth in Table IV. Polymerizations were then carried out as described. The effects of catalyst on the molecular weight of the poly(methyl methacrylate) are summarized in Table IV.

TABLE IV

| C/I | % Conversion | $\overline{M}_n$ | $\overline{M}_w$ | $\overline{M}_w/\overline{M}_n$ | Peak Value |
|---|---|---|---|---|---|
| 0.01 | 41 | 2,330 | 4,190 | 1.80 | 4,000 |
| 0.005 | 46 | 4,660 | 10,100 | 2.16 | 8,000 |
| 0.0025 | 69 | 6,540 | 15,100 | 2.31 | 12,600 |

EXAMPLE 8

The Use of [Co(II)DDDD-H]+ n-C4H9CH(C2H5)COO- a Catalytic Chain Transfer Agent in the Copolymerization of Styrene, n-Butyl Methacrylate and Hydroxyethyl Methacrylate A monomer mixture of styrene, n-butyl methacrylate and low-acid grade hydroxyethyl methacrylate, 15/50/35 wt % respectively, was prepared Each of four reaction vessels was charged with 157 g (1.2 mol) of the monomer mixture and 293 mL of methyl ethyl ketone and the contents was stirred under nitrogen for 0.5 h. To each was added 2.0 g (0.012 mol) of 2,2,'-azobis-(isobutyronitrile) and then, to three of the vessels was added, respectively, 27, 13.5 and 7 mg of DDDD-H2 (Example 1A) followed, respectively, by 120, 60 and 30 ml of 1 M cobalt octanoate in naphtha, so as to achieve the C/I ratios shown in Table V. The polymerization carried out in the fourth vessel, without the catalyst, served as a control experiment. The mixtures were refluxed for three hours, then cooled and stripped. The effects of catalyst on the molecular weights of the copolymers produced are summarized in Table V.

TABLE V

| C/I | % Conversion | $\overline{M}_n$ | $\overline{M}_w$ | $\overline{M}_w/\overline{M}_n$ | Peak MW |
|---|---|---|---|---|---|
| 0.01 | 88 | 1,090 | 2,210 | 2.02 | 2,070 |
| 0.005 | 100 | 2,660 | 5,550 | 2.08 | 4,100 |
| 0.0025 | 99 | 3,260 | 7,150 | 2.19 | 5,300 |
| 0.0 | 97 | 12,200 | 24,200 | 1.97 | 22,000 |

EXAMPLE 9

The Use of [Co(II)DDDD-H]+ n-C4H9CH(C2H5)COO- as a Catalytic Chain Transfer Agent in the Copolymerization Styrene, Methyl Methacrylate, Lauryl Metacrylate and Hydroxyethyl Methacrylate - Methyl Ethyl Ketone Solvent A monomer mixture containing styrene, methyl methacrylate, lauryl methacrylate and low-acid grade hydroxyethyl methacrylate, 15/10/45/30 wt % respectively, was prepared Each of three reaction vessels was charged with 185 g (1.2 mol) of the monomer mixture, 345 mL of methyl ethyl ketone and 2.0 g (0.12 mol) of 2,2,-azobis(isobutyronitrile). Two of the vessels were charged with ligand and cobalt octanoate, as described in Example 8, to achieve C/I of 0.01 and 0.005; the third vessel was kept free of catalyst and served as a control. The polymerizations were carried out as described in Example 8. The effects of catalyst on the molecular weights of the copolymers produced are summarized in Table VI.

TABLE VI

| C/I | % Conversion | $\bar{M}_n$ | $\bar{M}_w$ | $\bar{M}_w/\bar{M}_n$ | Peak MW |
|---|---|---|---|---|---|
| 0.01 | 99 | 4,050 | 8,690 | 2.15 | 7,200 |
| 0.005 | 99 | 11,700 | 25,100 | 2.14 | 19,000 |
| 0.0 | 100 | 14,900 | 34,900 | 2.35 | 29,000 |

EXAMPLE 10

The Use of [Co(II)DDDD-H]+ n-C$_4$H$_9$CH(C$_2$H$_5$)COO− as a Catalytic Chain Transfer Agent in the Copolymerization of Styrene, Methyl Methacrylate, Lauryl Methacrylate and Hydroxyethyl Methacrylate - Toluene Solvent Polymerizations similar to those described in Example 9 were carried out, except that the methyl ethyl ketone solvent was replaced by 320 mL of reagent-grade toluene. The molecular weight data are summarized in Table VII.

TABLE VII

| C/I | % Conversion | $\bar{M}_n$ | $\bar{M}_w$ | $\bar{M}_w/\bar{M}_n$ | Peak MW |
|---|---|---|---|---|---|
| 0.01 | 99 | 4,370 | 8,760 | 2.01 | 6,500 |
| 0.005 | 100 | 6,910 | 16,200 | 2.35 | 11,000 |
| 0.0 | 100 | 12,700 | 34,900 | 2.75 | 29,000 |

EXAMPLE 11

The Use of [Co(II)DDDD-H]+ n-C$_4$H$_9$CH(C$_2$H$_5$)COO− as a Catalytic Chain Transfer Agent in the Copolymerization of Styrene, n-Butyl Methacrylate, Butyl Acrylate and Hydroxyethyl Methacrylate - Methyl Ethyl Ketone Solvent A monomer mixture was prepared from styrene, n-butyl methacrylate, butyl acrylate and hydroxyethyl methacrylate, 15/25/25/35 wt % respectively Two polymerization vessels were each charged with 100 g (0.78 mol) portions of the monomer mixture and 186 mL of methyl ethyl ketone and deaerated as in Example 8; then, 1.3 g (0.008 mol) of 2,2'-azobis(isobutyronitrile) was added to each, and to one, 18 mg of DDDD-H$_2$ (Example 1A) ligand (0.00008 mol) and 80 ml of 1 M cobalt octanoate (0.00008 mol). The polymerizations were carried out as described in Example 8 and the molecular weight data are summarized in Table VIII.

TABLE VIII

| C/I | % Conversion | $\bar{M}_n$ | $\bar{M}_w$ | $\bar{M}_w/\bar{M}_n$ | Peak MW |
|---|---|---|---|---|---|
| 0.01 | 92 | 10,800 | 20,200 | 1.87 | 17,000 |
| 0.0 | 92 | 12,900 | 24,000 | 1.92 | 21,000 |

EXAMPLE 12

The Use of [Co(II)DDDD-H]+ n-C$_4$H$_9$CH(C$_2$H$_5$)COO− as a Catalytic Chain Transfer Agent in the Copolymerization of Styrene, n-Butyl Methacrylate, Butyl Acrylate and Hydroxyethyl Methacrylate - Toluene Solvent Example 11 was repeated, except that 172 mL of toluene was used as the solvent. The molecular weight data are summarized in Table IX.

TABLE IX

| C/I | % Conversion | $\bar{M}_n$ | $\bar{M}_w$ | $\bar{M}_w/\bar{M}_n$ | Peak MW |
|---|---|---|---|---|---|
| 0.01 | 87 | 9,130 | 19,300 | 2.12 | 15,000 |
| 0.0 | 99 | 13,100 | 29,100 | 2.22 | 19,000 |

EXAMPLE 13

The Use of [Co(II)DDDD-H]+ n-C$_4$H$_9$CH(C$_2$H$_5$)COO− as a Chain Transfer Agent in the Copolymerization of Styrene, Methyl Methacrylate, Lauryl Methacrylate and Hydroxyethyl Methacrylate - Feed Process To a 62 g (0.4 mol) portion of the monomer mixture described in Example 9 contained in the reservoir of a pumping device was added 0.66 g (0.004 mol) of 2,2'-azobis(isobutyronitrile), 4.5 mg of DDDD-H$_2$ (Example 1A) ligand (0.00002 mol) and 30 ml of 1 M cobalt octanoate in naphtha (0.00002 mol), such that C/I = 0.005. Some ligand remained undissolved. The mixture was constantly stirred at room temperature to keep undissolved ligand in even suspension while being pumped into 47 mL of refluxing toluene under a nitrogen atmosphere. Pumping time was 1.5 h and heating at reflux temperature was continued for an additional 0.5 h. The mixture was then cooled and stripped free of solvent. A similar procedure was carried out on a batch containing twice the amount of catalyst components and also on a control batch containing only the 2,2'-azobis-(isobutyronitrile). Molecular weight data are summarized in Table X.

TABLE X

| C/I | % Conversion | $\bar{M}_n$ | $\bar{M}_w$ | $\bar{M}_w/\bar{M}_n$ | Peak MW |
|---|---|---|---|---|---|
| 0.01 | 96 | 2,100 | 3,250 | 1.54 | 2,900 |
| 0.005 | 100 | 2,570 | 3,750 | 1.46 | 3,400 |
| 0.0 | 100 | 14,600 | 34,400 | 2.35 | 27,000 |

Similar results were obtained with 2,2'-azobis(2-methyl)butanenitrile as initiator; this has greater solubility in the monomer and, therefore, affords greater latitude in formulating product mixes. In one experiment with C/I=0.005, the copolymer product had the following characteristics: $\bar{M}_n$ 3,650, $\bar{M}_w$ 6,320, $\bar{M}_w/\bar{M}_n$ 1.73, peak MW 4,600.

EXAMPLE 14

A. Alternate Catalyst Preparation [Co(II)DDDD-H]+ n-C$_4$H$_9$CH(C$_2$H$_5$)COO− Toluene Solution For some purposes it is preferable to prepare and isolate cobalt(II) octanoate rather than use commercially-available material To this end, a mixture of 12 g (0.1 mol) of anhydrous cobalt(II) carbonate and 28.8 g (0.2 mol) of 2-ethylhexanoic acid in 200 mL of xylene was refluxed under nitrogen in an apparatus having a water takeoff head. Seventy-five mL of solvent was distilled out during the first 6 h, then simple reflux was maintained for 60 h. The deep purple solution was cooled to room temperature, suction filtered through a medium frit glass funnel, and the filtrate was freed of solvent on a rotary evaporator at 90°, 15 Torr. The yield of viscous purple sirup was 34.7 g (100%). Analysis showed it to be 88% pure.

To prepare the catalyst, a bottle was charged with 1.72 g (5 mmol) of the cobalt octanoate from the preceding paragraph, 100 mL of toluene and a magnetic stirring bar; the vessel was sealed with a rubber septum.

The mixture was deaerated by bubbling it with nitrogen and stirring for 1 h; then, 1.13 g (5 mmol) of DDDD-H$_2$ (Example IA) ligand was added and the vessel was resealed under air-free conditions. Stirring was continued for 18 h and the solution was refrigerated at 5° C. until further use. The concentration was 0.05 M For some purposes a concentration of 0.1 M is preferred, as in Example 15 in which case the aforesaid preparative amounts are appropriately adjusted B. The Use of [Co(II)DDDD-H]$^+$ n-C$_4$H$_9$CH(C$_2$H$_5$)COO$^-$ as a Catalytic Chain Transfer Agent in the Copolymeriation of Styrene, Methyl Methacrylate, Lauryl Methacrylate and Hydroxyethyl Methacrylate - Feed Process with Preformed Catalyst A system similar to that of Example 13 was set up, except that to the monomer mixture was added 0.77 g (0.004 mol) of 2,2,'-azobis(2-methyl)butanenitrile and 0.4 mL of the 0.05 M catalyst solution from Part A (C/I =0.005). Feed time and work up were as described in Example 13. The copolymer product, obtained in 98% conversion, had the following characteristics: $\overline{M}_n$ 6,000, $\overline{M}_w$ 9,150, $\overline{M}_w/\overline{M}_n$ 1.53 and peak MW 8,300.

Three additional experiments were carried out with varying amounts of catalyst, as in Example 13. Molecular weight data are summarized in Table XI.

TABLE XI

| C/I | % Conversion | $\overline{M}_n$ | $\overline{M}_w$ | $\overline{M}_w/\overline{M}_n$ | Peak MW |
|---|---|---|---|---|---|
| 0.01 | 99 | 4,940 | 7,800 | 1.58 | 6,800 |
| 0.0075 | 99 | 5,580 | 8,870 | 1.59 | 7,800 |
| 0.005 | 97 | 6,010 | 9,360 | 1.56 | 8,300 |

These data may be compared to the data for the control in Example 13.

EXAMPLE 15

The Use of [Co(II)DDDD-H]$^+$ n-C$_4$H$_9$CH(C$_2$H$_5$)COO$^-$ as a Catalytic Chain Transfer Agent in the Copolymerization of Styrene, Methyl Methacrylate, n-Butyl Methacrylate and 2,4-Hexadienyl (Sorbyl) Methacrylate A monomer mixture of styrene, methyl methacrylate, n-butyl methacrylate and sorbyl methacrylate, 10/22/58/10 mol % (7.9/16.8/62.7/12.6 wt respectively, was prepared. To a 50 g (0.38 mol) portion was added 0.68 g (0.0038 mol) of 2,2'-azobis(2-methyl)-butanenitrile and 0.19 mL of the 0.1 M catalyst solution from Example 14A (C/I =0.005). The mixture was fed into 38 mL of refluxing toluene during 30 minutes and refluxing was continued for an additional 30 minutes. The mixture was cooled and stripped free of solvent. Conversion to the expected copolymer was 68%, $\overline{M}_n$ 4,590, $\overline{M}_w$ 15,400, $\overline{M}_w/\overline{M}_n$ 3.35, peak RW 7,400. A control polymerization without catalyst gave a nproduct with $\overline{M}_n$ 11,400, $\overline{M}_w$, 324,000, $\overline{M}_w/\overline{M}_n$ 28.45 (trimodal with peaks of 10,000, 35,000 and 1,400,000).

EXAMPLE 16

The Use of [Co(II)DDDD-H]$^+$n-C$_4$H$_9$CH(C$_2$H$_5$)COO- as a Catalytic Chain Transfer Agent in the Copolymerization of Styrene, Methyl Methacrylate, n-Butyl Methacrylate and Allyloxyethyl Methacrylate A monomer mixture similar to that used in Example 15 was prepared, except that the sorbyl methacrylate was replaced by allyloxyethyl methacrylate, and the respective amounts of monomers in the mixture were 7.9/16.7/62.5/12.9 wt %. A similar polymerization (C/I=0.01) was carried out. Conversion to the expected copolymer was 80%, $\overline{M}_n$ 5,780, $\overline{M}_w$ 15,300, $\overline{M}_w/\overline{M}_n$ 2.65, peak MW 8,800. A control polymer without catalyst gelled during the 30 minute post-feed reflux period.

EXAMPLE 17

The Use of [Co(II)DDDD-H]$^+$ n-C$_4$H$_9$CH(C$_2$H$_5$)COO- as a Catalytic Chain Transfer Agent in the Coplymerization of Styrene, Methyl Methacrylate, n-Butyl Methacrylate, Sorbyl Methacrylate and Allyloxyethyl Methacrylate A monomer mixture of styrene, methyl methacrylate, n-butyl methacrylate, sorbyl methacrylate and allyloxyethyl methacrylate, 10/30/45/5/10 mole % (8.0/23.2/49.3/6.4/13.1 wt %) respectively, was prepared. To a 50 g (0.39 mol) portion was added 0.7 mL (0.004 mol) of 2-(t-butylazo)-2-cyanopropane and 0.2 mL of 0.1 M catalyst solution from Example 14A, such that C/I=0.005 This mixture was fed into 38 mL of refluxing toluene during 30 minutes and refluxing was continued for an additional 30 minutes. Work up in the usual way afforded an 84% conversion to the expected copolymer; $\overline{M}_n$ 6,960, $\overline{M}_w$ 32,500, $\overline{M}_w/\overline{M}_n$ 4.6, peak MW 10,000. An uncatalyzed control gelled 10 minutes after completing the feed.

EXAMPLE 18

Catalyzed Chain Transfer in the Copolymerization of Methyl Methacrylate, n-Butyl Methacrylate, Allyloxyethyl Methacrylate and Sorbyl Methacrylate with Various Catalysts A monomer mixture of methyl methacrylate, n-butyl methacrylate, allyloxyethyl methacrylate and sorbyl methacrylate, 40/45/10/5 mole % (31.0/49.4/13.2/6.4 wt %) respectively, was prepared To 50 g (0.39 mol) portions was added 0.74 g (0.0039 mol) of 2,2'-azobis(2-methyl)-butanenitrile and the appropriate catalyst. The catalyst used was [Co(II)DDDD-H]+ n-C$_4$H$_9$CH(C$_2$H$_5$)COO- (Example 14A). Feed run polymerizations similar to that of Example 15 were carried out. The results are summarized in Table XII.

TABLE XII

| Run No. | Catalyst | C/I | % Conversion | $\overline{M}_n$ | $\overline{M}_w$ | $\overline{M}_w/\overline{M}_n$ |
|---|---|---|---|---|---|---|
| 1 | C-1 | 0.005 | 71 | 3,980 | 10,300 | 2.58 |
| 2 | C-1 | 0.0025 | 80 | 7,280 | 33,100 | 4.54 |
| 7 | None | 0.0 | 76 | 12,300 | 1,082,000 | 87.63 |

EXAMPLE 19

Catalyzed Chain Transfer in the Copolymerization of Styrene, Methyl Methacrylate, Lauryl Methacrylate and Hydroxyethyl Methacrylate with Various Catalysts Portions of a monomer mixture of styrene, methyl methacrylate, lauryl methacrylate and hydroxyethyl methacrylate (as in Example 9) were mixed with 2,2'-azobis(2-methyl)butanenitrile, such that the monomer-/initiator molar ratio was 60, and with [CO-(II)TTCT]$^{+2}$ 2[n-C$_4$H$_9$CH(C$_2$H$_5$)COO]- in ethanol (Example 5B), such that C/I=0.005. Feed runs in toluene solvent similar to those of Example 13 and 14B were carried out, with a feed time of 0.5 h. for a 0.25 mol monomer batch. Results are summarized in Table XIII.

TABLE XIII

| Catalyst | % Conversion | $\overline{M}_n$ | $\overline{M}_w$ | $\overline{M}_w/\overline{M}_n$ | Peak MW |
|---|---|---|---|---|---|
| C-4 | 88 | 7,860 | 13,500 | 1.72 | 12,000 |

TABLE XIII-continued

| Catalyst | % Conversion | $\overline{M}_n$ | $\overline{M}_w$ | $\overline{M}_w/\overline{M}_n$ | Peak MW |
|---|---|---|---|---|---|
| None | 96 | 11,700 | 22,200 | 1.90 | 17,000 |

EXAMPLE 20

The use of [Co(II)DDDD-H]+ n-$C_4H_9CH(C_2H_5)COO^-$ as a Catalytic Chain Transfer Agent in the Copolymerization of Styrene, Methyl Methacrylate, Lauryl Methacrylate and Glycidyl Methacrylate A 100 g (0.67 mol) portion of a monomer mixture of styrene, methyl methacrylate, lauryl methacrylate and glycidyl methacrylate, 15/15/40/30 wt % respectively, was mixed with 1.3 g (0.0067 mol) of 2,2'-azobis(2-methyl)butanenitrile and 0.67 mL of freshly prepared 0.1 M [Co(II)DDDD-H]+ -$C_4H_9CH(C_2H_5)COO^-$ in toluene from Example 14A (C/I=0.01). A feed run into 77 mL of refluxing toluene was carried out as previously described. The copolymer product, obtained in 88% conversion, had the following characteristics: $\overline{M}_n$ 8,270, $\overline{M}_w$ 21,900, $\overline{M}_w/\overline{M}_n$ 2.65, peak MW 14,000. The control run which was carried out with azobis(2-methylisobutyronitrile) as the initiator providec copolymer having the following characteristics: $\overline{M}_n$ 13,700, $\overline{M}_w$ 42,900, $\overline{M}_w/\overline{M}_n$ 3.14, peak MW 32,000.

EXAMPLE 21

The Use of [Co(II)DDDD-H]+ n--$C_4H_9CH(C_2H_5)COO-$ as a Catalytic Chain Transfer Agent in the Copolymerization of Styrene, Methyl Methacrylate, Lauryl Methacrylate, Glycidyl Methacrylate and Hydroxyethyl Methacrylate A monomer mixture of styrene, methyl methacrylate, lauryl methacrylate, glycidyl methacrylate and hydroxyethyl methacrylate, 15/15/40/15/15 wt % respectively, was polymerized as in Example 20. The copolymer was produced in 88% conversion; $\overline{M}_n$ 5,760, $\overline{M}_w$ 11,800, $\overline{M}_w/\overline{M}_n$ 2.04, peak MW 8,300. An uncatalyzed control experiment provided copolymer having the following characteristics: $\overline{M}_n$ 12,400, $\overline{M}_w$ 33,700, $\overline{M}_w/\overline{M}_n$ 2.72, peak MW 27,000.

EXAMPLE 22

The Use of [Co(II)Salen] as a Catalytic Chain Transfer Agent in the Free Radical Polymerization of Methyl Methacrylate In a nitrogen drybox, 21.4 mL (0.2 mol) of methyl methacrylate, which had been previously sparged with nitrogen and passed through a column of Woelm alumina (grade 1), was added to a 100 mL volumetric flask. To this was added the desired amount of [Co(II)Salen], a commercially available material, and the volume was brought to 100 mL with distilled methanol.

To a 300 mL round bottom flask was added 62 mg ($2.5 \times 10^{-4}$ mol) of 2,2'-azobis(2-methyl)butanenitrile and a G.C. sample was taken. The round bottom flask was capped with a water cooled condenser, brought out of the drybox and heated to reflux under nitrogen for six hours. The reaction mixture was then allowed to cool to room temperature and a second G.C. sample was taken. The poly(methyl methacrylate) which was produced was isolated by removing solvent and monomer from the reaction mixture via a rotary evaporator. The results are given in Table IX.

TABLE IX

| Catalyst Concn. | $\overline{M}_n$ | $\overline{M}_w$ | $\overline{M}_w/\overline{M}_n$ |
|---|---|---|---|
| $6.0 \times 10^{-6}$ M | 51000 | 128000 | 2.51 |
| $1.2 \times 10^{-5}$ M | 47700 | 117000 | 2.45 |
| $6.0 \times 10^{-5}$ M | 14400 | 29400 | 2.04 |
| $3.0 \times 10^{-4}$ M | 4070 | 8860 | 2.18 |

EXAMPLE 23

A. Preparation of 5,8-Diaza-2,11-dioxo-4,9-dimethyldodeca-4,8-diene (ACEN-$H_2$)

ACEN-$H_2$ was prepared by the method of P. J. McCarthy, R. J. Hovey, K. Ueno, A. E. Martell, J. Am. Chem. Soc., 77, 5820-4 (1955).

Ethylenediamine (9.00 g, 0.15 mol) was added slowly to acetylacetone (30.00 g, 0.30 mol). After addition, the mixture turned solid. The solid was filtered and rinsed with water. The solid was recrystallized from water and dried 24 h at 65o under vacuum to yield 23.82 g (70.9% yield) of ACEN-$H_2$.

B. Preparation of [Co(II)ACEN]

A 0.002 M solution of [Co(II)ACEN]was prepared in situ by adding 45 mg of ACEN-$H_2$ from Part A and 50 mg of $Co(II)(OAc)_2.4H_2O$ to 100 mL of methanol.

C. The Use of [Co(II)ACEN]as a Catalytic Chain Transfer Agent in the Free Radical Polymerization of Methyl Methacrylate Example 22 was repeated using [Co(II)ACEN], prepared in Part B., as the catalytic chain transfer agent. The results are shown in Table X.

TABLE X

| Catalyst Concn. | $\overline{M}_n$ | $\overline{M}_w$ | $\overline{M}_w/\overline{M}_n$ |
|---|---|---|---|
| $6.0 \times 10^{-6}$ M | 46100 | 107000 | 2.32 |
| $1.2 \times 10^{-5}$ M | 48600 | 108000 | 2.22 |
| $6.0 \times 10^{-5}$ M | 42900 | 87800 | 2.05 |
| $3.0 \times 10^{-4}$ M | 29500 | 53200 | 1.80 |

BEST MODE FOR CARRYING OUT THE INVENTION

The best mode presently contemplated for carrying out the invention is represented by the disclosure and claims herein, it being understood that selection of the best mode will depend on a variety of factors, including the monomer(s) being polymerized, the chain transfer agent and the initiator employed, and the amounts thereof, and the polymerization conditions, such as temperature, pressure, conversion and yield.

We claim:

1. In an improved free radical polymeriation of acrylic and/or styrene monomers wherein molecular weight control is effected by means of a chain transfer agent, the improvement characterized in that the chain transfer agent is a cobalt chelate of the formula (IV) 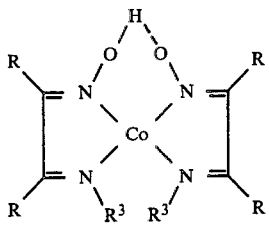

(VI) 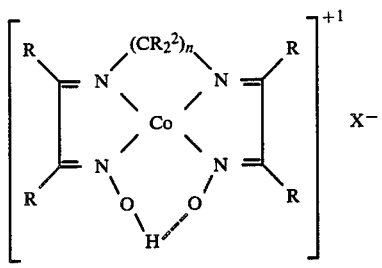

(VII) 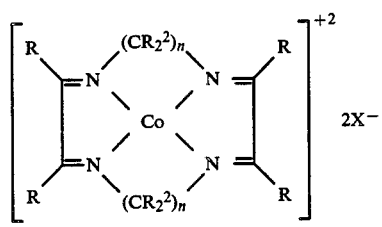

(VIII) 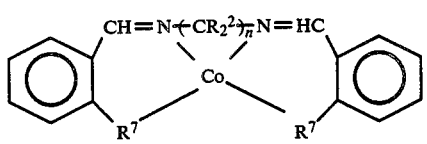

(IX) 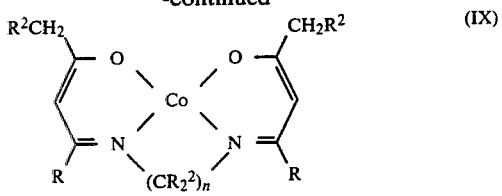

wherein each R, independently, is phenyl or $C_1$ to $C_{12}$ alkyl wherein each a-carbon atom contains two hydrogen atoms, or R and R on adjacent carbon atoms, taken together, is $C_5$ to $C_8$ cycloalkylene, unsubstituted in the a-positions; $R^2$ is H or $C_xH_{2x+1}$ wherein x is 1 to 12; each $R^3$, independently, is H or $C_1$ to $C_{12}$ branched or straight alkyl; $R^7$ is 0 or NH; n is 2 or 3; and $X^-$ is $NO_3^-$, $Cl^-$, $Br^-$, $I^-$, $BF_4^-$, $PF_6^-$, $SbF_6^-$ or $R^1COO^-$ wherein $R_1$ is $C_1$ to $C_{12}$ alkyl; provided, however, each of either or both aromatic rings in VIII optionally is substituted with a benzo group and optionally contains up to four substituents.

2. Process of claim 1 which is carried out at 50°–150° C.

3. Process of claim 2 which is carried out at 80°–110° C.

4. Process of claim 3 which is carried out in the presence of an initiator selected from the group consisting of azocumene; 2,2'-azobis(isobutyronitrile); 2,2'-azobis (2-methyl)butanenitrile; 4,4'-azobis(4-cyanovaleric acid); and 2 1 (t-butylazo)-2-cyanopropane.

5. Process of claim 1 wherein an organic solvent provides a polymerization medium.

6. Process of claim 1 wherein a single monomer is homopolymerized.

7. Process of claim 6 wherein the monomer is methyl methacrylate.

8. Process of claim 6 wherein the monomer is styrene.

9. Process of claim 1 wherein a mixture of comonomers is copolymerized.

10. Process of claim 9 wherein the mixture includes methyl methacrylate.

11. Process of claim 9 wherein the mixture includes styrene.

12. Process of claim 1 wherein the substituents in VIII are selected from $-OR^2$, $-NR_2^2$, $-Cl$, $-Br$, $-I$, $-NO_2$ and $-R^5$ wherein $R^5$ is $C_xH_{2x+1}$ wherein x is 1 to 12.

13. Process of claim 1 wherein the cobalt chelate is of structure VI.

* * * * *

UNITED STATES PATENT AND TRADEMARK OFFICE
CERTIFICATE OF CORRECTION

PATENT NO.    : 4,680,352
DATED         : July 14, 1987
INVENTOR(S)   : Andrew H. Janowicz and Lester R. Melby It is certified that error appears in the above-identified patent and that said Letters Patent is hereby corrected as shown below:

Column 5, lines 1 to 10 and Claim 1, Column 19, lines 5 to 10, structure (IV) should be

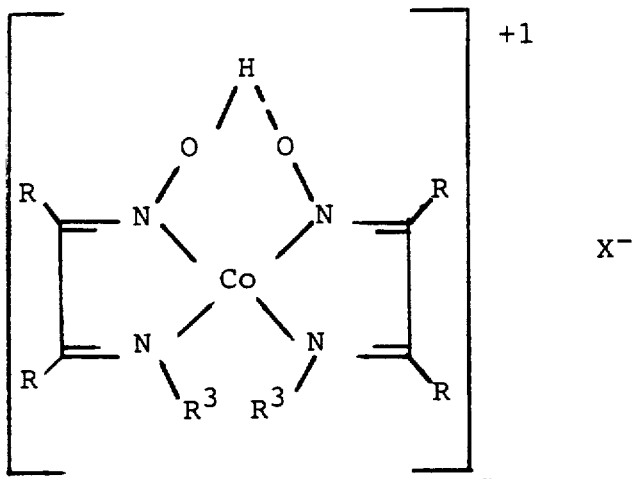

Signed and Sealed this

Eleventh Day of June, 1991

*Attest:*

HARRY F. MANBECK, JR.

*Attesting Officer*    *Commissioner of Patents and Trademarks*